United States Patent
Yoon et al.

(10) Patent No.: US 9,485,007 B2
(45) Date of Patent: Nov. 1, 2016

(54) REPEATER, BROADCAST TRANSMITTING SYSTEM AND METHOD FOR RELAYING BROADCAST SIGNAL

(75) Inventors: Eung-sik Yoon, Suwon-si (KR); Sun-ho Yang, Seoul (KR); Cheon-seong Lee, Yongin-si (KR); Tae-don Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 13/487,515

(22) Filed: Jun. 4, 2012

(65) Prior Publication Data

US 2012/0307710 A1 Dec. 6, 2012

Related U.S. Application Data

(60) Provisional application No. 61/493,007, filed on Jun. 3, 2011, provisional application No. 61/503,864, filed on Jul. 1, 2011.

(51) Int. Cl.
| | |
|---|---|
| *H04B 7/14* | (2006.01) |
| *H04W 88/04* | (2009.01) |
| *H04W 84/12* | (2009.01) |
| *H04B 7/155* | (2006.01) |

(52) U.S. Cl.
CPC ...... *H04B 7/15542* (2013.01); *H04B 7/15507* (2013.01)

(58) Field of Classification Search
CPC ....... H04L 25/22; H04L 9/0855; H04B 3/20; H04B 7/15; H04B 7/15542; H04B 7/15507; H04N 7/20; H03H 7/46
USPC ........................................................ 370/315
See application file for complete search history.

(56) References Cited

U.S. PATENT DOCUMENTS

| | | | | |
|---|---|---|---|---|
| 5,640,694 | A | * | 6/1997 | Milton, Jr. ..................... 455/133 |
| 5,733,831 | A | * | 3/1998 | Takada et al. ................ 501/135 |
| 6,584,080 | B1 | | 6/2003 | Ganz et al. |
| 7,953,383 | B2 | * | 5/2011 | Cho et al. ..................... 455/260 |

(Continued)

FOREIGN PATENT DOCUMENTS

| | | |
|---|---|---|
| CN | 1720755 A | 1/2006 |
| CN | 101438519 A | 5/2009 |
| EP | 2030331 | 11/2007 |

OTHER PUBLICATIONS

Communication dated Jun. 4, 2014 issued by the United States Patent and Trademark Office in counterpart U.S. Appl. No. 13/487,732.

(Continued)

*Primary Examiner* — Andrew Chriss
*Assistant Examiner* — Ellen Kirillova
(74) *Attorney, Agent, or Firm* — Sughrue Mion, PLLC

(57) ABSTRACT

A repeater, broadcast transmitting system, and method for relaying a broadcast signal between a gateway apparatus and a client apparatus are provided. The repeater includes a first interface which is configured to be connected to a gateway apparatus via a Wi-Fi communication protocol and is configured to receive a broadcast signal from the gateway apparatus; and a second interface which is configured to be connected to a client apparatus via the Wi-Fi communication protocol and is configured to transmit the broadcast signal to the client apparatus, wherein the first interface and the second interface use different frequency bands.

8 Claims, 13 Drawing Sheets

(56) References Cited

U.S. PATENT DOCUMENTS

| | | | |
|---|---|---|---|
| 7,990,904 B2 | 8/2011 | Proctor, Jr. et al. | |
| 8,131,209 B1* | 3/2012 | Chen et al. | 455/11.1 |
| 8,570,983 B2 | 10/2013 | Mohebbi | |
| 2002/0048071 A1 | 4/2002 | Suzuki et al. | |
| 2003/0084159 A1 | 5/2003 | Blewett | |
| 2003/0216121 A1* | 11/2003 | Yarkosky | H04B 7/2606 455/12.1 |
| 2004/0267896 A1* | 12/2004 | Patel et al. | 709/217 |
| 2006/0041680 A1* | 2/2006 | Proctor, Jr. et al. | 709/238 |
| 2006/0097574 A1* | 5/2006 | Gidge et al. | 307/3 |
| 2006/0098592 A1 | 5/2006 | Proctor, Jr. et al. | |
| 2006/0171445 A1* | 8/2006 | Batra et al. | 375/130 |
| 2006/0223439 A1 | 10/2006 | Pinel et al. | |
| 2007/0264935 A1 | 11/2007 | Mohebbi | |
| 2008/0141048 A1 | 6/2008 | Palmer et al. | |
| 2008/0159376 A1* | 7/2008 | Yamaguchi | 375/233 |
| 2008/0205261 A1 | 8/2008 | Mohebbi | |
| 2009/0291632 A1 | 11/2009 | Braithwaite et al. | |
| 2009/0323713 A1* | 12/2009 | Futch et al. | 370/442 |
| 2010/0040178 A1 | 2/2010 | Sutton et al. | |
| 2010/0159859 A1 | 6/2010 | Rofougaran | |
| 2010/0197235 A1 | 8/2010 | Wilhelmsson | |
| 2010/0197317 A1* | 8/2010 | Sadek et al. | 455/452.2 |
| 2010/0240302 A1* | 9/2010 | Buczkiewicz et al. | 455/11.1 |
| 2010/0296404 A1* | 11/2010 | Quadri et al. | 370/252 |
| 2010/0309828 A1* | 12/2010 | Nguyen et al. | 370/281 |
| 2011/0085477 A1 | 4/2011 | Schiff | |
| 2011/0150123 A1* | 6/2011 | Han et al. | 375/295 |
| 2011/0299444 A1 | 12/2011 | Rofougaran | |
| 2012/0156989 A1 | 6/2012 | Rofougaran | |

OTHER PUBLICATIONS

Communication dated Dec. 5, 2013 issued by the United States Patent and Trademark Office in counterpart U.S. Appl. No. 13/487,732.

U.S. Appl. No. 13/487,732, Eung-sik Yoon, et al., filed Jun. 4, 2012.

Communication dated Oct. 6, 2014 issued by United States Patent and Trademark Office in counterpart U.S. Appl. No. 13/487,732.

Communication dated Apr. 29, 2015, issued by the United States Patent and Trademark Office in counterpart U.S. Appl. No. 13/487,732.

Communication dated Jun. 9, 2015, issued by the European Patent Office in counterpart European Application No. 12159847.8.

Communication dated Jun. 9, 2015, issued by the European Patent Office in counterpart European Application No. 12159843.7.

Communication dated Jun. 21, 2016, issued by the State Intellectual Property Office of the People's Republic of China in counterpart Chinese Application No. 201210181191.7.

Communication dated Jul. 4, 2016, issued by the State Intellectual Property Office of the People's Republic of China in counterpart Chinese Application No. 201210180164.8.

* cited by examiner

FIG. 10

| Channel No | Ch Bonding | CENTER FREQUENCY(MHz) | BANDWIDTH(MHz) |
|---|---|---|---|
| 36 | Y | 5180 | ±10 |
| 40 |   | 5200 | ±10 |
| 44 | Y | 5220 | ±10 |
| 48 |   | 5240 | ±10 |
| 52 | Y | 5260 | ±10 |
| 56 |   | 5280 | ±10 |
| 60 | Y | 5300 | ±10 |
| 64 |   | 5320 | ±10 |
| 100 | Y | 5500 | ±10 |
| 104 |   | 5520 | ±10 |
| 108 | Y | 5540 | ±10 |
| 112 |   | 5560 | ±10 |
| 116 | Y | 5580 | ±10 |
| 120 |   | 5600 | ±10 |
| 124 | Y | 5620 | ±10 |
| 128 |   | 5640 | ±10 |
| 132 | N | 5660 | ±10 |
| 136 | Y | 5680 | ±10 |
| 140 |   | 5700 | ±10 |
| 149 | Y | 5745 | ±10 |
| 153 |   | 5765 | ±10 |
| 157 | Y | 5785 | ±10 |
| 161 |   | 5800 | ±10 |
| 165 | N | 5825 | ±10 |

(a)

| Channel No | Ch Bonding | CENTER FREQUENCY(MHz) | BANDWIDTH (MHz) |
|---|---|---|---|
| 36 | Y | 5180 | ±10 |
| 40 |   | 5200 | ±10 |
| 44 | Y | 5220 | ±10 |
| 48 |   | 5240 | ±10 |
| 52 | Y | 5260 | ±10 |
| 56 |   | 5280 | ±10 |
| 60 | Y | 5300 | ±10 |
| 64 |   | 5320 | ±10 |
| 100 | Y | 5500 | ±10 |
| 104 |   | 5520 | ±10 |
| 108 | Y | 5540 | ±10 |
| 112 |   | 5560 | ±10 |
| 116 | Y | 5580 | ±10 |
| 120 |   | 5600 | ±10 |
| 124 | Y | 5620 | ±10 |
| 128 |   | 5640 | ±10 |
| 132 | N | 5660 | ±10 |
| 136 | Y | 5680 | ±10 |
| 140 |   | 5700 | ±10 |
| 149 | Y | 5745 | ±10 |
| 153 |   | 5765 | ±10 |
| 157 | Y | 5785 | ±10 |
| 161 |   | 5800 | ±10 |
| 165 | N | 5825 | ±10 |

(b)

| Channel No | Ch Bonding | CENTER FREQUENCY(MHz) | BANDWIDTH (MHz) |
|---|---|---|---|
| 36 | Y | 5180 | ±10 |
| 40 |   | 5200 | ±10 |
| 44 | Y | 5220 | ±10 |
| 48 |   | 5240 | ±10 |
| 52 | Y | 5260 | ±10 |
| 56 |   | 5280 | ±10 |
| 60 | Y | 5300 | ±10 |
| 64 |   | 5320 | ±10 |
| 100 | Y | 5500 | ±10 |
| 104 |   | 5520 | ±10 |
| 108 | Y | 5540 | ±10 |
| 112 |   | 5560 | ±10 |
| 116 | Y | 5580 | ±10 |
| 120 |   | 5600 | ±10 |
| 124 | Y | 5620 | ±10 |
| 128 |   | 5640 | ±10 |
| 132 | N | 5660 | ±10 |
| 136 | Y | 5680 | ±10 |
| 140 |   | 5700 | ±10 |
| 149 | Y | 5745 | ±10 |
| 153 |   | 5765 | ±10 |
| 157 | Y | 5785 | ±10 |
| 161 |   | 5800 | ±10 |
| 165 | N | 5825 | ±10 |

REPEATER, BROADCAST TRANSMITTING SYSTEM AND METHOD FOR RELAYING BROADCAST SIGNAL

CROSS-REFERENCE TO RELATED APPLICATIONS

This application claims the priority from U.S. Provisional Application No. 61/493,007, filed on Jun. 3, 2011 and No. 61/503,864, filed on Jul. 1, 2011, in the United States Patent and Trademark Office, and Korean Patent Application No. 10-2011-0107227, filed on Oct. 19, 2011, in the Korean Intellectual Property Office, the disclosures of which are incorporated herein by reference in their entireties.

BACKGROUND

1. Field

Methods and apparatuses consistent with exemplary embodiments relate to a repeater, a broadcast transmitting system, and a method for relaying a broadcast signal, and more particularly, to a repeater which exchanges a broadcast signal with a gateway apparatus and a client apparatus therebetween, a broadcast transmitting system, and a method for relaying a broadcast signal.

2. Description of the Related Art

With the development of radio communication technology, a repeater which can extend a transmission distance in a transmitting and receiving system has been increasingly used. As the transmission distance in the transmitting and receiving system is longer, a signal transmitted from a transmitter is weaker. Therefore, the repeater amplifies the signal received from the transmitter and transmits the amplified signal to a receiver.

A related-art repeater uses the same channel to transmit a signal to a transmitter and a receiver. However, there is a problem in that a data transmission rate is cut in half if the same channel is used.

Accordingly, there is a demand for a method for extending a transmission distance of data, while maintaining a data transmission rate constantly.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiment provides a repeater which exchanges a broadcast signal between a gateway apparatus and a client apparatus using channels in different frequency bands.

According to an aspect of an exemplary embodiment, there is provided a repeater including: a first interface which is configured to be connected to a gateway apparatus via a Wi-Fi communication protocol and is configured to receive a broadcast signal from the gateway apparatus; and a second interface which is configured to be connected to a client apparatus via the Wi-Fi communication protocol and is configured to transmit the broadcast signal to the client apparatus, and the first interface and the second interface use different frequency bands.

The different frequency bands include a lower frequency band corresponding to the first interface and an upper frequency band corresponding to the second interface, and the lower and the upper frequency bands are separated from each other by a predetermined number of channels or a predetermined frequency band.

The different frequency bands may be included in an unlicensed frequency band.

The different frequency bands may include a frequency band that is higher than a dynamic frequency selection (DFS) frequency band and a frequency band that is lower than the DFS frequency band.

The different frequency bands may include a lower frequency band corresponding to the first interface and an upper frequency band corresponding to the second interface, and each of the lower and the upper frequency bands may include channels of a DFS frequency band and channels of a non-DFS frequency band.

The different frequency bands may include an upper frequency band corresponding to the first interface and a lower frequency band corresponding to the second interface, and each of the upper and the lower frequency bands may include channels of a DFS frequency band and channels of a non-DFS frequency band.

The different frequency bands may be included in an unlicensed frequency band within a frequency band of 5 GHz defined by the Wi-Fi communication protocol.

The different frequency bands are may be included in an unlicensed frequency band that is higher than a DFS frequency band defined within the frequency band of 5 GHz and an unlicensed frequency band that is lower than the DFS frequency band.

The first interface may further include a first antenna, and the second interface may include a second antenna, and resonant frequencies of the first and second antennas may be respectively tuned to the different frequency bands.

At least one of the first and second antennas may be ceramic and have a Q value larger than a predetermined Q value.

According to an aspect of another exemplary embodiment, there is provided a broadcast transmitting system including a gateway apparatus and a repeater which are connected to each other according to a Wi-Fi communication protocol, the broadcast transmitting system including: the gateway apparatus which transmits a broadcast signal to the repeater via a predetermined frequency band; and the repeater which transmits the broadcast signal to a client apparatus via a different frequency band, which is different from the predetermined frequency band.

The predetermined frequency band may be included in an unlicensed frequency band that is higher than a DFS frequency band within a 5 GHz defined by the Wi-Fi communication protocol, and the different frequency band is included in an unlicensed frequency band that is lower than the DFS frequency band.

The predetermined frequency band may be included in an unlicensed frequency band that is lower than a DFS frequency band defined by the Wi-Fi communication protocol, and the different frequency band may be included in an unlicensed frequency band that is higher than the DFS frequency band.

The repeater may transmit a channel tuning command requested by the client apparatus to the gateway apparatus, and the gateway apparatus may transmit a broadcast signal corresponding to the channel tuning command to the repeater.

The gateway apparatus may include: an interface which is connected to the repeater according to the Wi-Fi communication protocol; a tuner unit which tunes to a channel according to the channel tuning command received from the repeater; a signal processor which processes the broadcast signal, the broadcast signal being received through the channel tuned by the tuner unit; and a controller which controls the interface to transmit the broadcast signal, which is processed by the signal processor, to the repeater via the different frequency band.

The signal processor may convert the broadcast signal into an MPEG-2 transport stream (TS), and the interface transmits the MPEG-2 TS to the repeater via an unlicensed frequency band within a frequency band of 5 GHz defined by the Wi-Fi communication protocol.

According to an aspect of another exemplary embodiment, there is provided a method for relaying a broadcast signal between a gateway apparatus and a client apparatus, the method including: receiving the broadcast signal from the gateway apparatus via a predetermined frequency band; and transmitting the broadcast signal to the client apparatus via a different frequency band, which is different from the predetermined frequency band.

The predetermined frequency band and the different frequency band may be included in an unlicensed frequency band within a frequency band of 5 GHz defined by a Wi-Fi communication protocol.

The predetermined frequency band may be included in an unlicensed frequency band that is higher than a DFS frequency band defined within the frequency band of 5 GHz, and the different frequency band may be included in an unlicensed frequency band that is lower than the DFS frequency band.

The predetermined frequency band may be included in an unlicensed frequency band that is lower than a DFS frequency band defined within the frequency band of 5 GHz, and the different frequency band may be included in an unlicensed frequency band that is higher than the DFS frequency band.

BRIEF DESCRIPTION OF THE DRAWING FIGURES

The above and/or other aspects will be more apparent by describing in detail exemplary embodiments, with reference to the accompanying drawings, in which:

FIG. 10 is a table to explain channels which are used in an unlicensed frequency band for radio communication according to an exemplary embodiment;

DETAILED DESCRIPTION OF THE EXEMPLARY EMBODIMENTS

Figure 1:
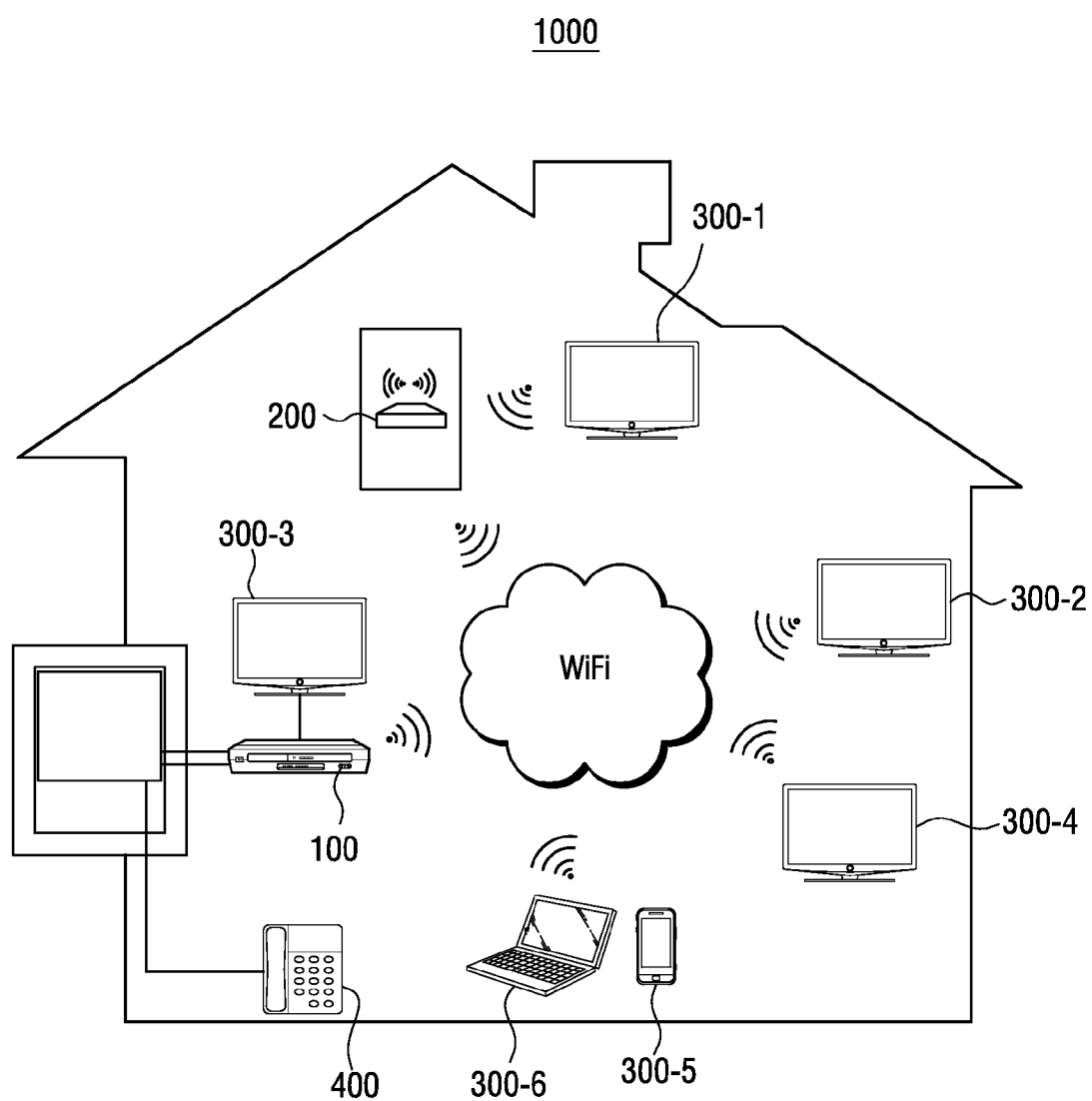
FIG. 1 is a view to explain a home network system according to an exemplary embodiment.

Hereinafter, exemplary embodiments will be described in greater detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, exemplary embodiments may be carried out without those specifically defined matters. Also, functions or elements known in the related art are not described in detail since they would obscure the exemplary embodiments with unnecessary detail.

FIG. 1 is a view to explain a home network system according to an exemplary embodiment. As shown in FIG. 1, a broadcast transmitting system 1000 according to an exemplary embodiment includes a gateway apparatus 100, a repeater 200, and client apparatuses 300-1, 300-2, 300-3, 300-4, 300-5, and 300-6.

The gateway apparatus 100 transmits various signals received from external sources to the repeater 200 and the client apparatuses 300-1, 300-2, 300-3, 300-4, 300-5, and 300-6 provided in a home.

More specifically, the gateway apparatus 100 may receive a digital cable broadcast signal (hereinafter, referred to as a broadcast signal) which is input from an external source through a cable (not shown) in a Quadrature Amplitude Modulation (QAM) method, and a data signal which is input in an Ethernet method.

The gateway apparatus 100 may transmit the broadcast signal to the repeater 200, which is connected according to a Wi-Fi communication protocol, using a predetermined frequency band. The gateway apparatus 100 may transmit the broadcast signal to the client apparatuses 300-1, 300-2, 300-3, 300-4, 300-5, and 300-6, which are connected according to the Wi-Fi communication protocol, using a predetermined frequency band.

The predetermined frequency band described herein may be included in a frequency band that is upper than a dynamic frequency selection (DFS) frequency band defined by the Wi-Fi communication protocol. Also, the predetermined frequency band may be included in a frequency band that is lower than the DFS frequency band defined by the Wi-Fi communication protocol.

More specifically, the gateway apparatus 100 may transmit the broadcast signal to the repeater 200 and the client apparatuses 300-1, 300-2, 300-3, 300-4, 300-5, and 300-6 using an unlicensed frequency band (Industrial, Scientific and Medical (ISM)) defined according to the Wi-Fi communication protocol. To achieve this, the gateway apparatus 100 may include a Wi-Fi communication module.

The unlicensed frequency band described herein is a frequency band prescribed by the U.S. Federal Communications Commission (FCC) and refers to a 2 GHz band or a 5 GHz band among low power frequency bands (902 MHz~928 MHz, 2.4 GHz~2.4835 GHz, 5.15 GHz~5.825 GHz) that anyone can use without permission. The DFS frequency band refers to a band of 5.225 GHz~5.715 GHz included in the unlicensed frequency band and may mean a band used for military radar or weather, radio navigation, or satellite radar.

The gateway apparatus 100 according to the present exemplary embodiment uses the 5 GHz of the unlicensed frequency bands and may transmit the broadcast signal using an unlicensed frequency band that is upper than the DFS frequency band within the 5 GHz or an unlicensed frequency band that is lower than the DFS frequency band.

The gateway apparatus 100 may transmit the broadcast signal and the data signal to the repeater 200 and the plurality of client apparatuses 300-1, 300-2, 300-3, 300-4, 300-5, and 300-6 using a cable. To achieve this, the gateway apparatus 100 may include an interface such as S-Video, component, composite, D-Sub, DVI, and a High Definition Multimedia Interface (HDMI).

The client apparatuses 300-1, 300-2, 300-3, 300-4, 300-5, and 300-6 receive the broadcast signal or the data signal from the gateway apparatus 100 or the repeater 200 and perform their respective functions.

For example, if the client apparatuses 300-1, 300-2, 300-3, and 300-4 are digital televisions (TVs), the client apparatuses 300-1, 300-2, 300-3, and 300-4 may perform processing with respect to video signals and audio signals included in the broadcast signal received from the gateway apparatus 100 or the repeater 200, and may provide the processed signals for the user. Herein, the client apparatuses 300-1, 300-2, 300-3, and 300-4 may receive the broadcast signal from the gateway apparatus 100 or the repeater 200 in a wire or radio communication method.

For another example, if the client apparatuses 300-5 and 300-6 are wireless terminals or laptop computers, the client apparatuses 300-5 and 300-6 may data-communicate with the gateway apparatus 100 or the repeater 200 using a Wi-Fi communication protocol or a cable.

Although the client apparatuses 300-1, 300-2, 300-3, 300-4, 300-5, and 300-6 are the digital TVs, the wireless terminals, or the laptop computers in the above exemplary embodiment, this is merely an example. That is, the client apparatuses 300-1, 300-2, 300-3, 300-4, 300-5, and 300-6 may be display apparatuses that output the broadcast signal and perform data-communication, such as desktops or portable multimedia players (PMPs).

On the other hand, in order to provide a seamless digital broadcast for the user, the client apparatuses 300-1, 300-2, 300-3, 300-4, 300-5, and 300-6 should receive a broadcast signal of a rate that is higher than a constant transmission rate (for example, 20 Mbps to 30 Mbps).

However, if the gateway apparatus 100 transmits the broadcast signal to the client apparatuses 300-1, 300-2, 300-3, 300-4, 300-5, and 300-6 using a radio method (for example, a Wi-Fi communication method), it is difficult to guarantee the constant transmission rate due to an obstacle such as a wall disposed between the client apparatuses 300-1, 300-2, 300-3, 300-4, 300-5, and 300-6 and the gateway apparatus 100.

Therefore, in order to extend the transmission rate and a transmission distance of the broadcast signal, the repeater 200 amplifies the broadcast signal received from the gateway apparatus 100 and transmits the amplified broadcast signal. That is, in order to transmit the broadcast signal received from the gateway apparatus 100 to the client apparatus 300-1 which is located in a region where the transmission rate of the broadcast signal is lower than 20 Mbps (or 30 Mbps), for example, in a shadow region, the repeater 200 may amplify the broadcast signal.

In this case, the repeater 200 may transmit the broadcast signal to the client apparatus 300-1 using a frequency band different from a predetermined frequency band.

The predetermined frequency band described herein refers to a frequency band that is used between the gateway apparatus 100 and the repeater 200.

Accordingly, if the predetermined frequency band is included in the unlicensed frequency band that is higher than the DFS frequency band defined by the Wi-Fi communication protocol, the different frequency band may be included in the unlicensed frequency band that is lower than the DFS frequency band. Also, if the predetermined frequency band is included in the unlicensed frequency band that is lower than the DFS frequency band defined by the Wi-Fi communication protocol, the different frequency band may be included in the unlicensed frequency band that is higher than the DFS frequency band.

That is, if the gateway apparatus 100 transmits the broadcast signal to the repeater 200 using the unlicensed frequency band that is higher than the DFS frequency band within the 5 GHz, the repeater 200 may transmit the broadcast signal to the client apparatus 300-1 using the unlicensed frequency band that is lower than the DFS frequency band. Also, if the gateway apparatus 100 transmits the broadcast signal to the repeater 200 using the unlicensed frequency band that is lower than the DFS frequency band within the 5 GHz, the repeater 200 may transmit the broadcast signal to the client apparatus 300-1 using the unlicensed frequency band that is upper than the DFS frequency band.

That is, since the repeater 200 transmits the broadcast signal to the client apparatus 300-1 using the frequency band which is different from the frequency band used between the repeater 200 and the gateway apparatus 100, interference between neighboring channels can be reduced.

To achieve this, the repeater 200 may include a station (STA) to receive the broadcast signal from the gateway apparatus 100 and an access point (AP) to transmit the broadcast signal received from the gateway apparatus 100 to the client apparatuses 300-1.

Also, as described above, the repeater 200 may differently operate a Wi-Fi channel connected to the gateway apparatus 100 (that is, a channel between the gateway apparatus 100 and the STA) and a Wi-Fi channel connected to the client apparatus 300-1 (that is, a channel between the client apparatus 300-1 and the AP).

Although one client apparatus receives the broadcast signal through the repeater in the above exemplary embodiment, this is merely an example. The plurality of client apparatuses may receive the broadcast signal through the repeater.

As shown in FIG. 1, the broadcast transmitting system 1000 may further include a wired terminal 400.

The wired terminal 400 may exchange an audio signal with an external source using a telephone line.

As described above, since the broadcast signal or the data signal input from the external source is transmitted using the Wi-Fi communication protocol, the user can enjoy the seamless digital broadcast service in any place without installing a separate cable in his/her home.

Also, since the repeater 200 relays the broadcast signal between the gateway apparatus 100 and the display apparatus using channels of the different frequency bands, performance deterioration caused by channel interference can be prevented.

Figure 2:
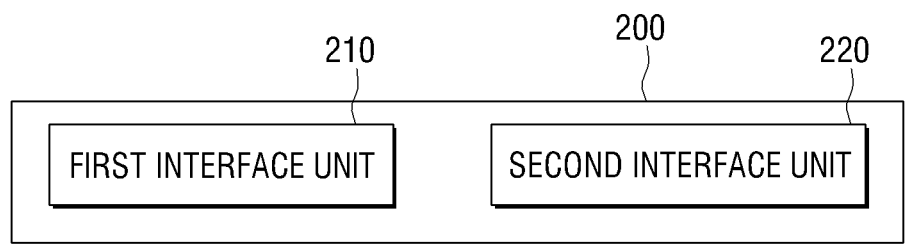
FIG. 2 is a block diagram illustrating a repeater according to an exemplary embodiment.

FIG. 2 is a block diagram illustrating a repeater according to an exemplary embodiment. As shown in FIG. 2, a repeater 200 comprises a first interface 210 and a second interface 220.

The first interface 210 is connected to a gateway apparatus according to a Wi-Fi communication protocol to receive a broadcast signal from the gateway apparatus.

The second interface 220 is connected to a client apparatus according to the Wi-Fi communication protocol to transmit the broadcast signal to the client apparatus.

To achieve this, each of the first interface 210 and the second interface 220 may be realized by a Wi-Fi communication module.

The first interface 210 and the second interface 220 may use different frequency bands.

The different frequency bands described herein may include a lower frequency band corresponding to the first interface 210 and an upper frequency band corresponding to the second interface 220, and the lower and the upper frequency bands may be separated from each other as much as a predetermined number of channels or a predetermined frequency band. That is, the different frequency bands may be separated from each other as much as a predetermined number of channels or a predetermined frequency band to reduce inter-channel interference occurring between the first interface 210 and the second interface 220.

More specifically, the different frequency bands used by the first interface 210 and the second interface 220 may be included in an unlicensed frequency band. More specifically, the different frequency bands may include a frequency band that is upper than a DFS frequency band and a frequency band that is lower than the DFS frequency band.

That is, the different frequency bands may be included in an unlicensed frequency band within the 5 GHz defined by the Wi-Fi communication protocol, and more specifically, may be included in an unlicensed frequency band that is upper than the DFS frequency band defined within 5 GHz and an unlicensed frequency band that is lower than the DFS frequency band.

More specifically, if the first interface 210 receives the broadcast signal from the gateway apparatus using the unlicensed frequency band that is upper than the DFS frequency band defined within 5 GHz defined by the Wi-Fi communication protocol, the second interface 220 may transmit the broadcast signal to the client apparatus using the unlicensed frequency band that is lower than the DFS frequency band.

If the first interface 210 receives the broadcast signal from the gateway apparatus using the unlicensed frequency band that is lower than the DFS frequency band defined within 5 GHz defined by the Wi-Fi communication protocol, the second interface 220 may transmit the broadcast signal to the client apparatus using the unauthorized frequency band that is upper than the DFS frequency band.

The unlicensed frequency band that is upper than the DFS frequency band may refer to a frequency band of 5.725 GHz~5.825 GHz (a frequency band of 5.8 GHz), and the unlicensed frequency band that is lower than the DFS frequency band may refer to a frequency band of 5.15 GHz~5.25 GHz (a frequency band of 5.2 GHz).

Accordingly, the first interface 210 and the second interface 220 may transmit the broadcast signal from the gateway apparatus 100 to the client apparatus 300 using channels of the different frequency bands even within the frequency band of 5 GHz defined by the Wi-Fi communication protocol.

The different frequency bands may include a lower frequency band corresponding to the first interface 210 and an upper frequency band corresponding to the second interface 220, and each of the lower and the upper frequency bands may include some channel of the DFS frequency band and some channel of a non-DFS frequency band. Also, the different frequency band may include an upper frequency band corresponding to the first interface 210 and a lower frequency band corresponding to the second interface 220, and each of the lower and the upper frequency bands may include some channel of the DFS frequency band and some channel of the non-DFS frequency band.

The different frequency bands used by the first interface 210 and the second interface 220 may be separated from each other as much as a predetermined number of channels or a predetermined frequency band to reduce inter-channel interference between the repeater 200 and another repeater.

The frequency bands used by the first interface 210 and the second interface 220 will be explained in detail with reference to FIG. 10 and FIGS. 12 to 14.

In the case of a data signal, the first interface 210 and the second interface 220 relay the data signal between the gateway apparatus 100 and the client apparatus 300 using a band of 2 GHz of the unlicensed frequency band, that is, a band of 2.4 GHz~2.4835 GHz.

The repeater 200 according to the present exemplary embodiment uses different frequency bands at a transmitting side and a receiving side. Accordingly, the repeater 200 may include a filter, an antenna, and a shield to remove radio channel interference caused by the use of the different channels at the transmitting side and the receiving side. Hereinafter, the repeater 200 will be explained in more detail with reference to FIGS. 3 to 4.

Figure 3:
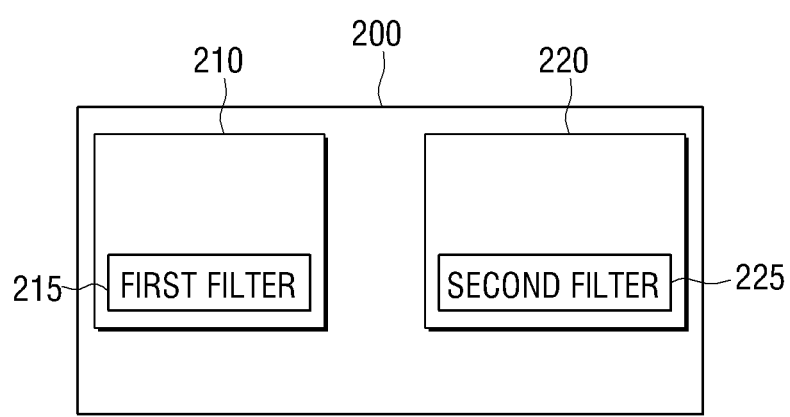
FIG. 3 is a block diagram illustrating a repeater according to an exemplary embodiment.

FIG. 3 is a block diagram illustrating a repeater according to an exemplary embodiment. As shown in FIG. 3, a repeater 200 includes a first interface 210, a second interface 220, and filters 215 and 225. In explaining FIG. 3, the elements using the same reference numerals as in FIG. 2 perform the same functions and thus an overlapping explanation is omitted.

The first interface 210 is connected to a gateway apparatus according to a Wi-Fi communication protocol.

The second interface 220 is connected to a client apparatus according to the Wi-Fi communication protocol.

The first interface 210 and the second interface 220 communicate with the gateway apparatus and the client apparatus, respectively, using different frequency bands. The different frequency bands may be included in an unlicensed frequency band that is upper than a DFS frequency band defined within a 5 GHz band and an unlicensed frequency band that is lower than the DFS frequency band. This has been described above with reference to FIG. 2.

At least one of the first interface 210 and the second interface 220 may include the filters 215 and 225 to remove a system noise by filtering the different frequency bands. Here, the system noise may refer to an interference which occurs from a transmitting system to a receiving system due to use of channels of the different frequency bands.

The first filter 215 of the first interface 210 filters the frequency band that is used for communication with the gateway apparatus. To achieve this, the first filter 215 may be realized by a band pass filter to filter only the frequency band used by the first interface 210.

The second filter 225 of the second interface 220 filters the frequency band that is used for communication with the client apparatus. To achieve this, the second filter 225 may be realized by a band pass filter to filter only the frequency band used by the second interface 210.

As transmitting and receiving sides use channels of different frequency bands, a high output signal at the transmitting side may be induced to the receiving side, affecting in-band noise. However, the repeater 200 according to the exemplary embodiment can prevent the in-band noise.

That is, if the second interface 220 transmits a broadcast signal to the client apparatus using the unlicensed frequency band that is upper than the DFS frequency band, some of the broadcast signal is prevented from being induced to the first interface 210 and thus interference in the broadcast signal received from the gateway apparatus through the first interface 210 can be suppressed. Accordingly, isolation performance of about 60 dB can be guaranteed.

Figure 4:
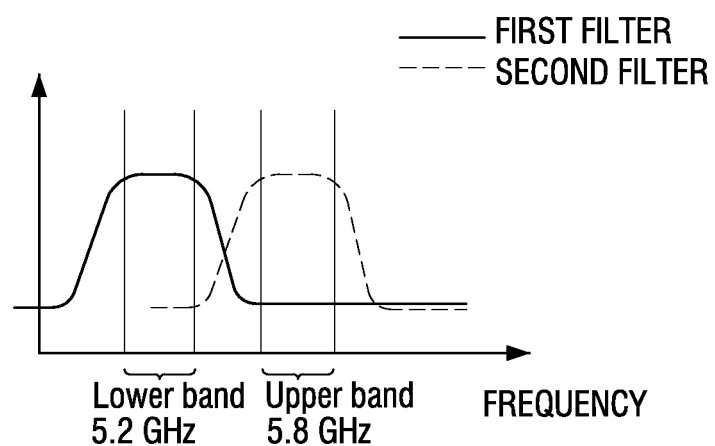
FIG. 4 is a view to explain a characteristic of a filter according to an exemplary embodiment.

FIG. 4 is a view to explain a characteristic of a filter according to an exemplary embodiment. More specifically, FIG. 4 illustrates filter characteristics of the first filter 215 and the second filter 225 if the first interface 210 uses a channel within the unlicensed frequency band that is lower than the DFS frequency band and the second interface 220 uses a channel within the unlicensed frequency band that is upper than the DFS frequency band.

For example, the first filter 215 may be realized by a band pass filter having a center frequency of 5.2 GHz and a bandwidth of 100 MHz so that the first filter 215 can filter only the unlicensed frequency band that is lower than the DFS frequency band. Also, the second filter 225 may be realized by a band pass filter having a center frequency of 5.775 GHz and a bandwidth of 100 MHz so that the second filter 225 can filter only the unlicensed frequency band that is upper than the DFS frequency band.

Accordingly, the system noise can be filtered by removing interference between the first interface 210 and the second interface 225 using the channels of the different frequency bands.

Although the first filter 215 has the center frequency of 5.2 GHz and the second filter 225 has the center frequency of 5.775 GHz in the above exemplary embodiment, this is merely an example. That is, if the first interface 210 uses the unlicensed frequency band that is upper than the DFS frequency band and the second interface 220 uses the unlicensed frequency band that is lower than the DFS frequency band, the first filter 215 may be realized by the band pass filter having the center frequency of 5.775 GHz and the second filter 225 may be realized by the bans pass filter having the center frequency of 5.2 GHz.

Figure 5:
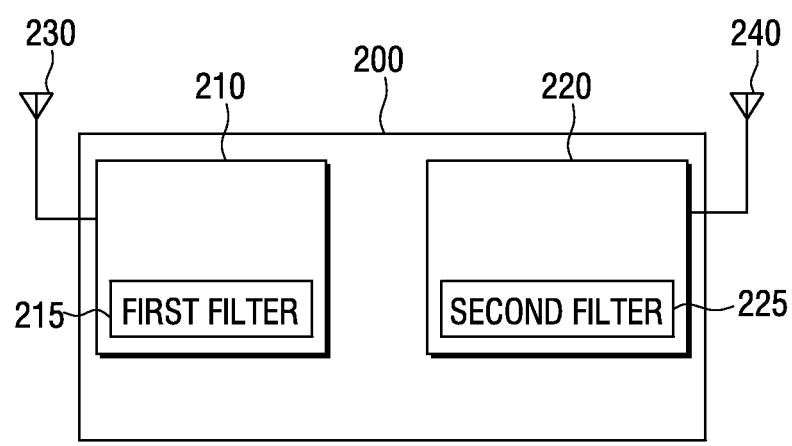
FIG. 5 is a block diagram illustrating a repeater according to an exemplary embodiment.

FIG. 5 is a block diagram illustrating a repeater according to an exemplary embodiment. As shown in FIG. 5, a repeater 200 includes a first interface 210, a second interface 220, filters 215 and 225, and antennas 230 and 240. In explaining FIG. 5, the elements using the same reference numerals as in FIGS. 2 and 3 perform the same functions and, thus an overlapping explanation is omitted.

The first interface 210 and the second interface 220 may further include at least one antenna 230 and at least one antenna 240, respectively, in which resonant frequencies are tuned to different frequency bands.

The different frequency bands may be included in an unlicensed frequency band that is upper than a DFS frequency band defined within a 5 GHz band and an unlicensed frequency band that is lower than the DFS frequency band. The at least one antenna 230 and the at least one antenna 240 may be realized by a ceramic antenna having a Q value larger than a predetermined Q value. Hereinafter, the antennas 230 and 240 will be explained in detail with reference to FIG. 6.

Figure 6:
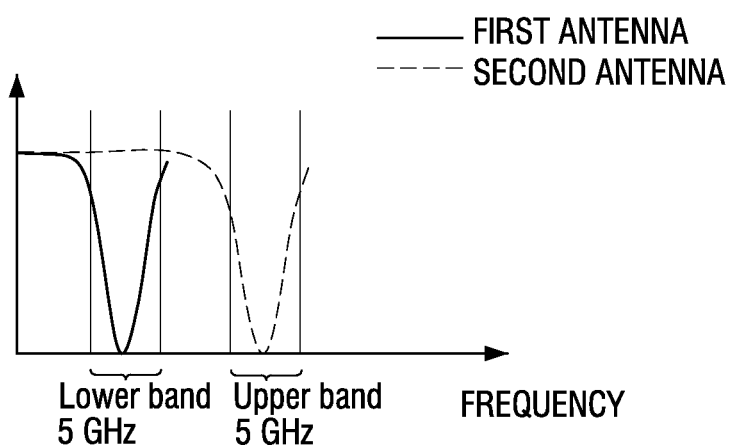
FIG. 6 is a view to explain a characteristic of an antenna according to an exemplary embodiment.

FIG. 6 is a view to explain antenna characteristics according to an exemplary embodiment. More specifically, FIG. 6 is a view to explain characteristics of the first antenna 230 and the second antenna 240 if the first interface 210 uses a channel within the unlicensed frequency band that is lower than the DFS frequency band and the second interface 220 uses a channel within the unlicensed frequency band that is upper than the DFS frequency band.

For example, as shown in FIG. 6, the first antenna 230 may be realized by a high Q ceramic antenna which has high frequency selectivity for the unlicensed frequency band that is lower than the DFS frequency band, that is, a frequency band of 5.15 GHz~5.25 GHz, and the second antenna 240 may be realized by a high Q ceramic antenna which has high frequency selectivity for the unlicensed frequency band that is higher than the DFS frequency band, that is, a frequency band of 5.725 GHz~5.825 GHz.

Accordingly, the resonant frequencies of the antennas at the transmitting side and the receiving sides can be limited. That is, the resonant frequencies of the channels between the first interface 210 and the second interface 220, which uses the channels of the different frequency bands, are separated from each other, so that an isolation effect of about 30 dB can be guaranteed.

Figure 7:
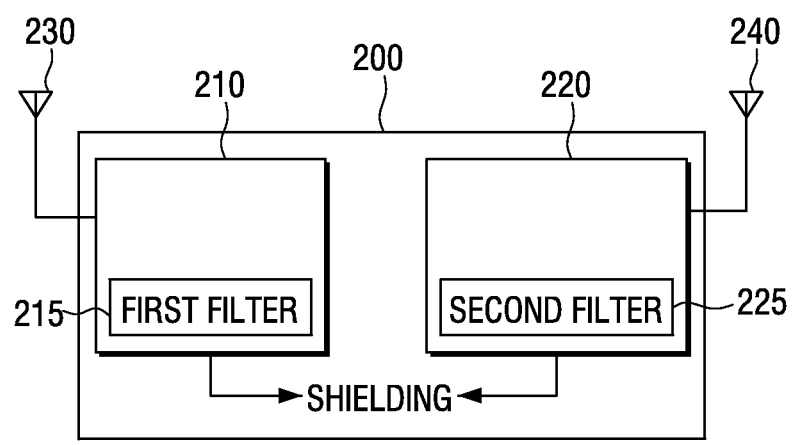
FIG. 7 is a block diagram illustrating a repeater according to an exemplary embodiment.

FIG. 7 is a block diagram illustrating a repeater according to an exemplary embodiment. As shown in FIG. 7, a repeater 200 includes a first interface 210, a second interface 220, filters 215 and 225, antennas 23 and 240, and a shield to shield each of the first interface 210 and the second interface 220. In explaining FIG. 7, the elements using the same reference numerals as in FIGS. 2, 3, and 5 perform the same functions and thus an overlapping explanation is omitted.

The repeater 200 according to the present exemplary embodiment may further include the shield to ground-shield each of the first interface 210 and the second interface 220. More specifically, the shield may be made of a conductive material such as aluminum and may connect the first interface 210 and the second interface 220 to the ground.

Accordingly, interference such as pattern coupling, air discharge, and a ground noise can be minimized by bypassing a high frequency noise generated at the transmitting side and the receiving side to the ground, so that an isolation effect of about 10 dB can be guaranteed between the first interface 210 and the second interface 220 which use channels of the different frequency bands.

Although the interference is reduced by ground-shielding the first interface 210 and the second interface 220 in the above exemplary embodiment, this is merely an example. That is, the interference between the first interface 210 and the second interface 220 may be reduced by separately shielding a printed circuit board (PCB) layer (for example, a six-layer PCB) formed in the first interface 210 and the second interface 220.

The repeater 200 according to an exemplary embodiment can guarantee an isolation effect of about 93 dB or higher between the first interface 210 and the second interface 220, which use the channels of the different frequency bands, using the filters 215 and 225, the antennas 230 and 240, and the shield.

In the above exemplary embodiments, the filters, the antennas, and the shielding process are added to the repeater in sequence. However, this is merely an example. The filters, the antennas, and the shielding process may be added to the repeater separately or in combination. That is, the repeater may be realized by a repeater including only the filters, a repeater including only the antennas, or a repeater including only the ground shielding process, or may be realized by a repeater including the filter and the ground shielding process.

Figure 8:
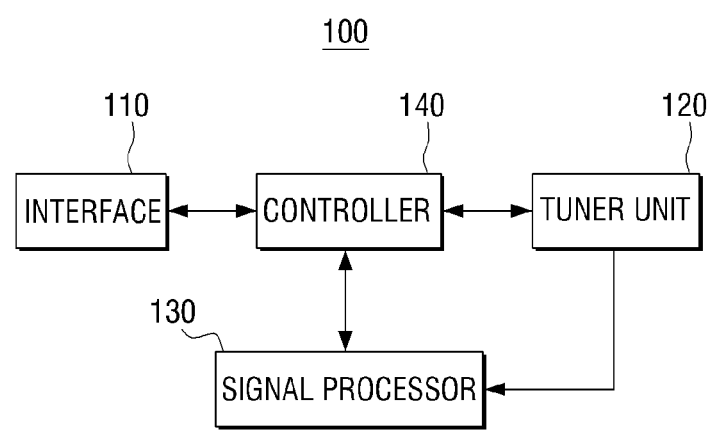
FIG. 8 is a block diagram illustrating a gateway apparatus according to an exemplary embodiment.

FIG. 8 is a block diagram illustrating a gateway apparatus according to an exemplary embodiment. As shown in FIG. 8, a gateway apparatus 100 includes an interface 110, a tuner unit 120, a signal processor 130, and a controller 140.

The interface 110 may be connected to a repeater according to a Wi-Fi communication protocol. More specifically, the interface 110 may transmit a broadcast signal to the repeater using an unlicensed frequency band that is upper than a DFS frequency band within 5 GHz defined by the Wi-Fi communication protocol or an unlicensed frequency band that is lower than the DFS frequency band. To achieve this, the interface 110 may include a Wi-Fi module.

Also, the interface 110 may be connected to at least one client apparatus according to the Wi-Fi communication protocol or a wire communication protocol.

More specifically, the interface 110 may transmit the broadcast signal to the client apparatus using an unlicensed frequency band that is upper than the DFS frequency band within 5 GHz defined by the Wi-Fi communication protocol or an unlicensed frequency band that is lower than the DFS frequency band. To achieve this, the interface 110 may include a Wi-Fi module.

The interface 110 may include S-Video, components, composite, D-Sub, DVI, and a high definition multimedia interface (HDMI), and may transmit the broadcast signal to the client apparatus via a hard-wired connection.

The interface 110 may receive a channel tuning command from the client apparatus or the repeater. The interface 110 may directly receive the channel tuning command from the client apparatus or may receive the channel tuning command requested by the client apparatus through the repeater if the gateway apparatus is connected to the client apparatus through the repeater.

The tuner unit 120 receives a broadcast signal from an external source.

More specifically, the tuner unit 120 includes a plurality of tuners (not shown) and tunes to at least one of broadcast signals received in a wired or wireless manner. That is, if a channel tuning command is received from the repeater or the client apparatus, the tuner unit 120 may tune to a channel according to the channel tuning command.

For example, if a tuning command regarding channels A, B, and C is received from each of the plurality of client apparatuses, the tuner unit 120 may tune to broadcast signals received through corresponding channels among the broadcast signals received in a wireless or wired manner.

Accordingly, the tuner unit 120 may include a plurality of tuners.

For example, the tuner unit 120 may include 6 tuners in total. Specifically, the tuner unit 120 may include three tuners to tune to broadcast signals to be provided to three client apparatuses connected to the interface 110 according to the Wi-Fi communication protocol, one tuner to tune to a broadcast signal to be provided to one client apparatus connected according to an HDMI method, one tuner to tune to a broadcast signal to be provided to one client apparatus connected according to a component (or composite) method, and one tuner to tune to a broadcast signal stored in a storage medium such as a hard disk drive provided in the gateway apparatus 100.

The three client apparatuses connected according to the Wi-Fi communication protocol may refer to client apparatus that are directly connected to the gateway apparatus 100 or are connected to the gateway apparatus 100 through the repeater.

Although the tuner unit 120 includes the 6 tuners in the above exemplary embodiment, this is merely an example. That is, the number of client apparatuses connected according to the Wi-Fi communication protocol may be less than 3 and the number of display apparatuses connected in a wired manner may be greater than 2. Also, the tuner unit 120 may include two or more tuners to tune the broadcast signal stored in the gateway apparatus 100. Accordingly, the tuner unit 120 may include tuners more than or less than 6.

The tuner unit 120 may be realized so as to receive a broadcast signal from an external apparatus such as an external set-top box connected through an external input unit (not shown).

The signal processor 130 processes the broadcast signal received through the channel tuned by the tuner unit 120. More specifically, the signal processor 130 converts the broadcast signal received through the tuned channel into a moving picture experts group-2 (MPEG-2) transport stream (TS) format in order to transmit the broadcast signal to at least one client apparatus connected according to the Wi-Fi communication protocol.

The signal processor 130 may decode the broadcast signal of an MPEG-2 format in order to transmit the broadcast signal to at least one client apparatus connected according to a wire communication protocol. To achieve this, the signal processor 130 may include an MPEG-2 decoder.

The controller 140 controls an overall operation of each of the elements of the gateway apparatus 100.

The controller 140 assigns internet protocols (IPs) to the plurality of client apparatuses according the Wi-Fi communication protocol to perform wireless communication with the client apparatus and the repeater through the interface 110 according to the Wi-Fi communication protocol.

If a channel tuning command is received from the client apparatus or the repeater wirelessly connected, the controller 140 may control the tuner unit 120 to receive a broadcast signal from a corresponding channel and control the signal processor 130 to convert the broadcast signal into an MPEG-2 TS.

The controller 140 may control the interface 110 to transmit the broadcast signal processed by the signal processor 130 to the repeater using a predetermined frequency band. The predetermined frequency band described herein may refer to an unlicensed frequency band that falls within a 5 GHz band defined by the Wi-Fi communication protocol, and more specifically, may refer to an unlicensed frequency band that is upper than a DFS frequency band within the 5 GHz or an unlicensed frequency band that is lower than the DFS frequency band.

Also, the controller 140 may control the interface 110 to directly transmit the broadcast signal processed by the signal processor 130 to the client apparatus. In this case, the controller 140 may transmit the broadcast signal to the client apparatus using the unlicensed frequency band that is upper than the DFS frequency band within 5 GHz or the unlicensed frequency band that is lower than the DFS frequency band.

One channel in the unlicensed frequency band or the DFS frequency band is defined as 20 GHz, and the controller 140 may transmit the broadcast signal to the repeater or the client apparatus through two channels using channel bonding, that is, through a 40 GHz band.

As described above, the client apparatus should guarantee a transmission rate of 20 Mbps to 30 Mbps in order to provide a seamless broadcast content for the user. To achieve this, the controller 140 may transmit the broadcast signal using the 40 GHz band and may transmit the broadcast signal to three client apparatus to the maximum to satisfy the transmission rate of 20 Mbps to 30 Mbps.

If a data signal is to be transmitted to a plurality of client apparatuses according to an Ethernet method, the controller 140 may control the interface 110 to use a 2 GHz frequency band which is used in the Wi-Fi communication protocol. That is, the controller 140 may perform data communication with the plurality of client apparatuses using a frequency band of 2.4 GHz~2.4835 GHz which is an unlicensed band in the 2 GHz frequency band.

If the controller 140 receives a channel tuning command from a client apparatus connected via a wired connection, the controller 140 may control the tuner unit 120 to receive a broadcast signal from a corresponding channel. The controller 140 may control the signal processor 130 to decode the broadcast signal of the MPEG-2 format and transmit the broadcast signal to the client apparatus.

Although the broadcast signal of the MPEG-2 format is decoded when being transmitted to the client apparatus connected via the wired connection in the above exemplary embodiment, this is merely an example. The gateway apparatus may transmit the broadcast signal of the MPEG-2 format to the client apparatus connected via the wired connection without decoding the broadcast signal.

The gateway apparatus 100 according to an exemplary embodiment may further include a storage unit (not shown) to store the broadcast signal received by the tuner unit 120. That is, if a user command to store the broadcast signal is input through the client apparatus or the repeater, the controller 140 may control at least one tuner of the tuner unit 120 to receive the broadcast signal of the corresponding channel and store the broadcast signal to the storage unit.

The storage unit (not shown) performing the above function may be realized by a non-volatile memory such as a hard disk drive (HDD), a flash memory, an electronically erasable and programmable ROM (EEPROM).

If a command to transmit the stored broadcast signal is received from the client apparatus through the interface 110, the controller 140 may control the signal processor 130 to process the broadcast signal stored in the storage unit 150.

Figure 9:
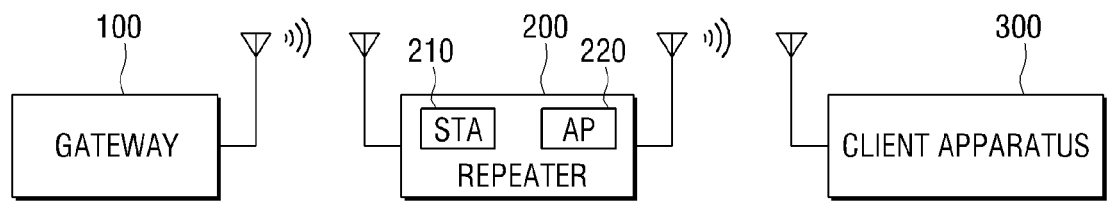
FIG. 9 is a view to explain a method in which a gateway apparatus transmits a broadcast signal to a client apparatus through a repeater according to an exemplary embodiment.

FIG. 9 is a view to explain a method in which a gateway apparatus transmits a broadcast signal to a client apparatus through a repeater according to an exemplary embodiment.

A repeater 200 transmits a channel tuning command requested by a client apparatus 300 to a gateway apparatus 100. The gateway apparatus 100 transmits a broadcast signal corresponding to the channel tuning command to the repeater 200. The gateway apparatus 10 may transmit the broadcast signal in an MPEG-2 TS format.

The repeater 200 may include a station (STA) 210 to receive the broadcast signal from the gateway apparatus 100 and an access point (AP) 220 to transmit the broadcast signal received from the gateway apparatus 100 to the client apparatus 300.

The STA 210 and the AP 220 receive the broadcast signal from the gateway apparatus 100 and transmit the broadcast signal to the client apparatus 300 using different channels within a 5 GHz band defined by a Wi-Fi communication protocol.

For example, the STA 210 may receive the broadcast signal from the gateway apparatus 100 using an unlicensed frequency band that is upper than a DFS frequency band within the 5 GHz, and the AP 220 may transmit the broadcast signal to the client apparatus 300 using an unlicensed frequency band that is lower than the DFS frequency band.

For another example, the STA 210 may receive the broadcast signal from the gateway apparatus 100 using an unlicensed frequency band that is lower than the DFS frequency band within the 5 GHz, and the AP 220 may transmit the broadcast signal to the client apparatus 300 using an unlicensed frequency band that is upper than the DFS frequency band.

The client apparatus 300 may process the broadcast signal received from the repeater 200 and provide the broadcast signal for the user.

More specifically, the client apparatus 300 divides the broadcast signal of the MPEG-2 TS format into a video signal, an audio signal, and additional information, and performs processing with respect to the video signal and the audio signal. That is, the client apparatus 300 may perform signal processing such as video decoding, video format analyzing, video scaling, and audio decoding with respect to the video signal and the audio signal.

The client apparatus 300 may provide the processed broadcast signal for the user through a display unit (not shown) and an audio output unit (not shown).

Although the repeater 200 is directly connected to the client apparatus 300 in the above exemplary embodiment, this is merely an example. The repeater 200 and the client apparatus 300 may be connected to each other through another repeater.

FIG. 10 is a table to explain channels used in an unlicensed frequency band for radio communication according to an exemplary embodiment.

As shown in FIG. 10, a gateway apparatus, a repeater, and a client apparatus exchange a broadcast signal using a frequency band (5.725 GHz~5.825 GHz) that is upper than a DFS frequency band within a 5 GHz band and a frequency band (5.15 GHz~5.25 GHz) that is lower than the DFS frequency band.

That is, a first interface of the repeater receiving the broadcast signal from the gateway apparatus may use the lower frequency band of 5.15 GHz~5.25 GHz corresponding to the first interface. A second interface of the repeater transmitting the broadcast signal to the client apparatus may use the upper frequency band of 5.725 GHz~5.825 GHz corresponding to the second interface. Accordingly, since channels used by the first interface and the second interface are separated from each other as much as a predetermined number or a predetermined frequency band, inter-channel interference occurring between the first interface and the second interface can be reduced.

In each of the upper band and the lower band, 20 GHz is defined as one channel. Therefore, the lower frequency band consists of four channels and the upper frequency band consists of five channels if a guard band is excluded from each band. That is, the lower band consists of channels Ch. 36, Ch. 40, Ch. 44, and Ch. 48 having a bandwidth of 20 MHz and having center frequencies 5180 MHz, 5200 MHz, 5220 MHz, and 5240 MHz, respectively, and the upper band consists of channels Ch. 149, Ch. 153, Ch. 157, Ch. 161, and Ch. 165 having a bandwidth of 20 MHz and having center frequencies 5745 MHz, 5765 MHz, 5785 MHz, 5800 MHz, and 5825 MHz. Hereinafter, a specific channel may be abbreviated as "Ch." (e.g., "Ch. 40").

According to an exemplary embodiment, the broadcast signal that the gateway apparatus transmits to the repeater or the client apparatus should guarantee a transmission rate of at least 60 Mbps in order to provide a seamless digital broadcast to three client apparatuses to the maximum extent through radio communication. Therefore, the gateway apparatus, the repeater, and the client apparatus may exchange the broadcast signal using a 40 MHz bandwidth by bonding two neighboring channels within the upper band or the lower band using channel bonding.

That is, two neighboring channels in the lower band, such as i) channels Ch. 36 and Ch. 40 and ii) channels Ch. 44 and Ch. 48 may be used and two neighboring channels in the upper band, such as i) channels Ch. 149 and Ch. 153 and ii) channels Ch. 157 and Ch. 161 may be used.

Figure 11:
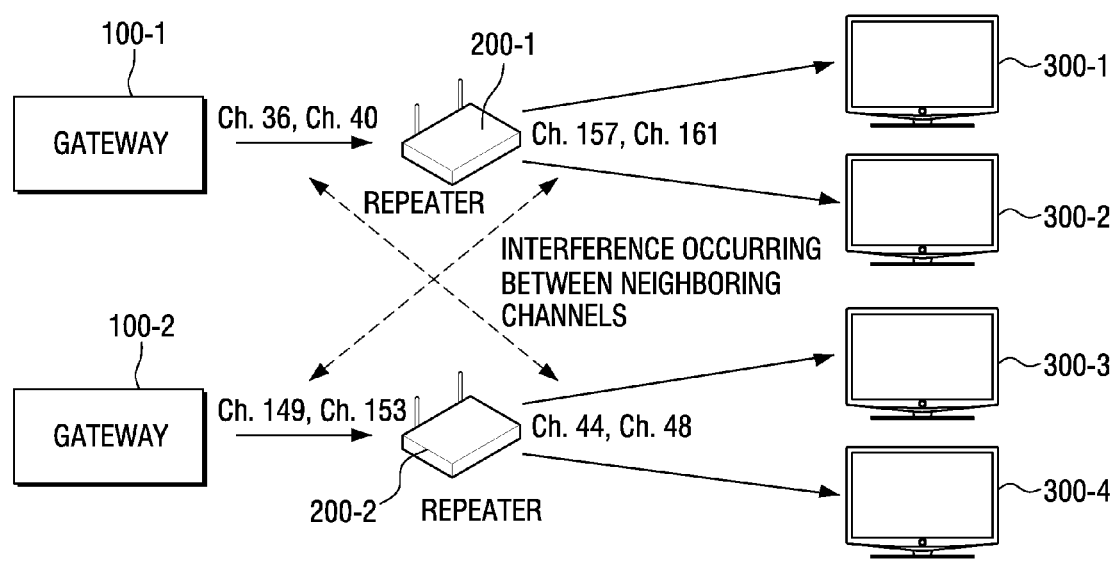
FIG. 11 is a view to explain interference between neighboring channels which may occur if two repeaters using different channels are used.

FIG. 11 is a view to explain inter-channel interference occurring if two repeaters using different channels are used.

As described above with reference to FIG. 10, the gateway apparatus, the repeater, and the client apparatus may exchange the broadcast signal using the bandwidth of 40 MHz by bonding two neighboring channels within the upper band or the lower band. Therefore, interference may occur between neighboring channels if two or more repeaters are used in a broadcast transmitting system simultaneously.

For example, it is assumed that a repeater 200-1 receives a broadcast signal from a gateway apparatus 100-1 using channels Ch. 36 and Ch. 40 and transmits the broadcast signal to client apparatuses 300-1 and 300-2 using channels Ch. 157 and Ch. 161, and that a repeater 200-2 receives a broadcast signal from a gateway apparatus 100-2 using channels Ch. 149 and Ch. 153 and transmits the broadcast signal to client apparatuses 300-3 and 300-4 using channels Ch. 44 and Ch. 48.

In this case, since the channels used between the repeater 200-1 and the gateway apparatus 100-1 neighbor the channels used between the repeater 200-2 and the client apparatuses 300-3 and 300-4, and the channels used between the repeater 200-1 and the client apparatuses 300-1 and 300-2 neighbor the channels used between the repeater 200-2 and the gateway apparatus 100-2, interference may occur between the neighboring channels.

Accordingly, in order to solve this problem, the repeater according to an exemplary embodiment may exchange the broadcast signal using a frequency band other than the unlicensed band, that is, a DFS frequency band. Hereinafter, the repeater according to an exemplary embodiment will be explained in detail with reference to FIGS. 12 to 14.

Figure 12:
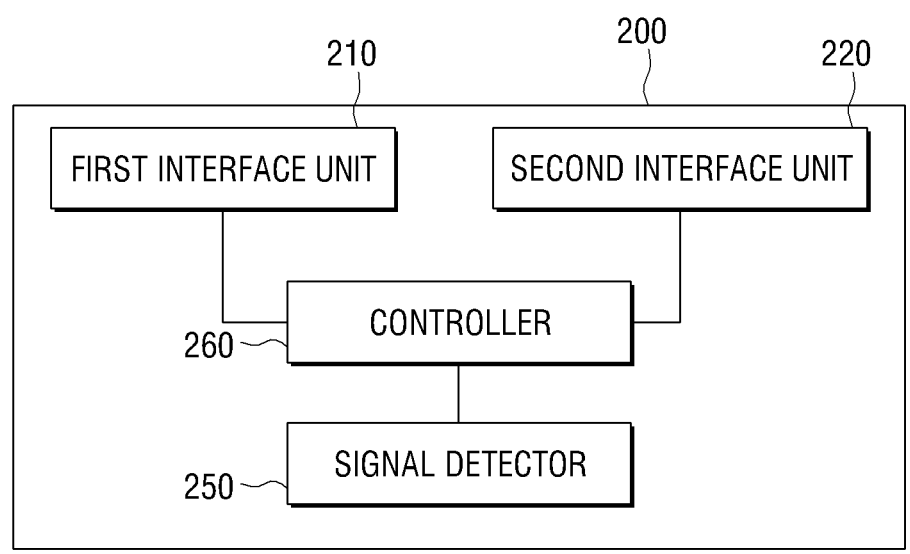
FIG. 12 is a block diagram illustrating a repeater in detail according to an exemplary embodiment.

FIG. 12 is a block diagram illustrating a repeater in detail according to an exemplary embodiment. As shown in FIG. 12, a repeater 200 includes a first interface 210, a second interface 220, a signal detector 250, and a controller 260. In explaining FIG. 12, the elements using the same reference numerals as in FIGS. 2, 3, 5, and 7 perform the same functions and thus an overlapping explanation is omitted.

The first interface 210 and the second interface 220 may communicate with a gateway apparatus and a client apparatus, respectively, using channels within a specific frequency band defined by a Wi-Fi communication protocol. The specific frequency band may refer to an unlicensed frequency band within a 5 GHz band defined by a Wi-Fi communication protocol.

The signal detector 230 may detect a frequency usage state of the specific frequency band and other frequency bands. More specifically, the signal detector 230 may detect whether an unlicensed frequency band and a DFS frequency band are used by another apparatus or not according to whether there is a signal received from the unlicensed frequency band and the DFS frequency band within the 5 GHz band defined by the Wi-Fi communication protocol. Another apparatus may include another repeater, military radar, and weather, radio navigation, or satellite radar.

If the frequency usage state of the specific frequency band is detected, the controller 240 may control at least one of the first interface 210 and the second interface 220 to use a channel of a frequency band different from the specific frequency band.

The specific frequency band may include a lower frequency band corresponding to the first interface 210 and the different frequency band may include an upper frequency band corresponding to the second interface 220. Each of the lower frequency band and the upper frequency band may include some channel of the DFS frequency band and some channel of a non-DFS frequency band.

Also, the specific frequency band may include an upper frequency band corresponding to the first interface 210 and the different frequency band may include a lower frequency band corresponding to the second interface 220. Each of the lower frequency band and the upper frequency band may include some channel of the DFS frequency band and some channel of the non-DFS frequency band.

The different frequency bands used by the first interface 210 and the second interface 220 may separated from each other as much as a predetermined number of channels or a predetermined frequency band so that inter-channel interference with another repeater can be reduced.

More specifically, the specific frequency band may refer to an unlicensed frequency band within the 5 GHz band defined by the Wi-Fi communication protocol and the frequency band different from the specific frequency band may refer to a DFS frequency band within the 5 GHz band defined by the Wi-Fi communication protocol.

If the frequency usage state of the specific frequency band is detected, the controller 240 may control at least one of the first interface 210 and the second interface 220 to use a channel using a frequency band separated from a frequency band used by a channel of the specific frequency band.

If a signal using frequency within the different frequency band is detected by the signal detector 230, the controller 240 may restrict the use of the frequency band used by the signal with respect to the first interface 210 and the second interface 220. That is, the controller 240 may control at least one of the first interface 210 and the second interface 220 to use a channel that is not used by another apparatus in the DFS frequency band. The above-described operation of the controller 240 will be explained in detail with reference to FIG. 13.

Each of the first interface 210 and the second interface 220 may further include at least one band pass filter to filter the specific frequency band and the different frequency band.

Each of the first interface 210 and the second interface 220 may further include at least one antenna in which a resonant frequency is tuned to a channel within the specific frequency band and a channel within the different frequency band.

The specific frequency band refers to an unlicensed frequency band within the 5 GHz defined by the Wi-Fi communication protocol and the frequency band different from the specific frequency band may refer to a DFS frequency band within the 5 GHz defined by the Wi-Fi communication protocol.

The repeater 200 may further include a shield to ground-shield each of the first interface 210 and the second interface 220.

The related exemplary embodiment has been described above with reference to FIGS. 3 to 7.

Figure 13:
FIG. 13 is a table to explain channels which are used in an unlicensed frequency band and a DFS frequency band for radio communication according to an exemplary embodiment.

FIG. 13 is a table to explain channels used in an unlicensed band and a DFS frequency band for radio communication. FIG. 13 (a) is a table to explain channels which are used in an unlicensed frequency band for radio communication and has been described above with reference to FIG. 10.

FIG. 13 (b) is a table to explain channels which are used in an unlicensed frequency band and a DFS frequency band for radio communication. As shown in FIG. 13 (b), the gateway apparatus, the repeater, and the client apparatus may exchange the broadcast signal using not only an unlicensed frequency band, that is, 5.15 GHz~5.25 GHz or 5.725 GHz~5.825 GHz, but also a DFS frequency band, that is, 5.25 GHz to 5.725 GHz.

The controller 240 may control the first interface 210 and the second interface 220 to use channels Ch. 52, Ch. 56, Ch. 60, Ch. 64, Ch. 124, Ch. 128, Ch. 136, and Ch. 140 having a bandwidth of 20 MHz and having center frequencies 5260 MHz, 5280 MHz, 5300 MHz, 5320 MHz, 5620 MHz, 5640 MHz, 5680 MHz, and 5700 MHz in the DFS frequency band.

Accordingly, the first interface of the repeater, which receives the broadcast signal from the gateway apparatus, may use the lower frequency band corresponding to the first interface, 5.15 GHz~5.25 GHz and 5.25 GHz~5.30 GHz. The second interface of the repeater, which transmits the broadcast signal to the client apparatus, may use the upper frequency band corresponding to the second interface, 5.610 GHz~5.650 GHz, 5.670 GHz~5.710 GHz, and 5.25 GHz~5.725 GHz. That is, each of the lower frequency band and the upper frequency band may include some channel of the DFS frequency band and some channel of a non-DFS frequency band.

For example, it is assumed that the first interface 210 receives the broadcast signal from the gateway apparatus using channels Ch. 36 and Ch. 40 of the unlicensed frequency band which is lower than the DFS frequency band, and that the second interface 220 transmits the broadcast signal to the client apparatus using channels Ch. 149 and Ch. 153 of the unlicensed frequency band that is upper than the DFS frequency band.

In this case, if the use state of the unlicensed frequency band is detected, that is, if another repeater uses channels Ch. 44 and Ch. 48 and channels Ch. 157 and Ch. 161, the controller 240 may control at least one of the first interface 210 and the second interface 220 to use the DFS frequency band.

More specifically, the controller 240 may control to use a channel that is separated from a channel used by another repeater among other channels defined within the DFS frequency band. In the above example, the controller 240 may control the first interface 210 to use channels Ch. 60 and Ch. 64 in the DFS frequency band and control the second interface 220 to use channels Ch. 136 and Ch. 140 in the DFS frequency band.

Accordingly, the channel separated from the channel used by another repeater is used so that interference can be reduced between neighboring channels.

If channels Ch. 136 and Ch. 140 in the DFS frequency band is used by another apparatus, the controller 240 may prevent the second interface 220 from using the channels used by another apparatus and may control the second interface 220 to use channels Ch. 124 and Ch. 128.

Figure 14:
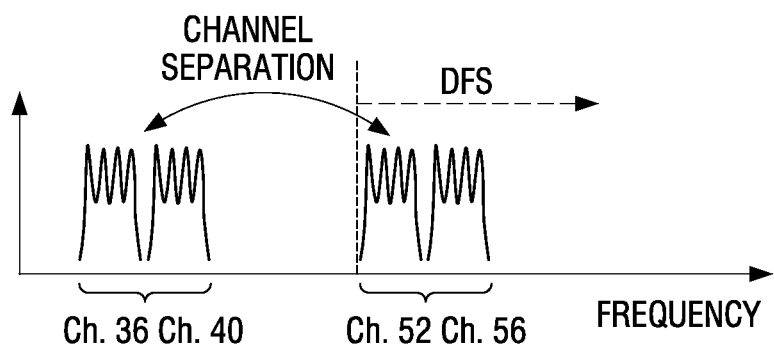
FIG. 14 is a view to explain a method for removing interference between neighboring channels according to an exemplary embodiment.

FIG. 14 is a view to explain a method for removing interference between neighboring channels according to an exemplary embodiment. If two or more repeaters are used as shown in FIG. 14, a repeater according to an exemplary embodiment may use a frequency band that is separated from a frequency band used by another repeater as much as a predetermined number of channels or a predetermined frequency band in order to reduce inter-channel interference with another repeater.

That is, the repeater can minimize interference which may occur between neighboring channels with respect to another repeater by using some channels Ch. 52 and Ch. 56 of the DFS frequency band.

Figure 15:
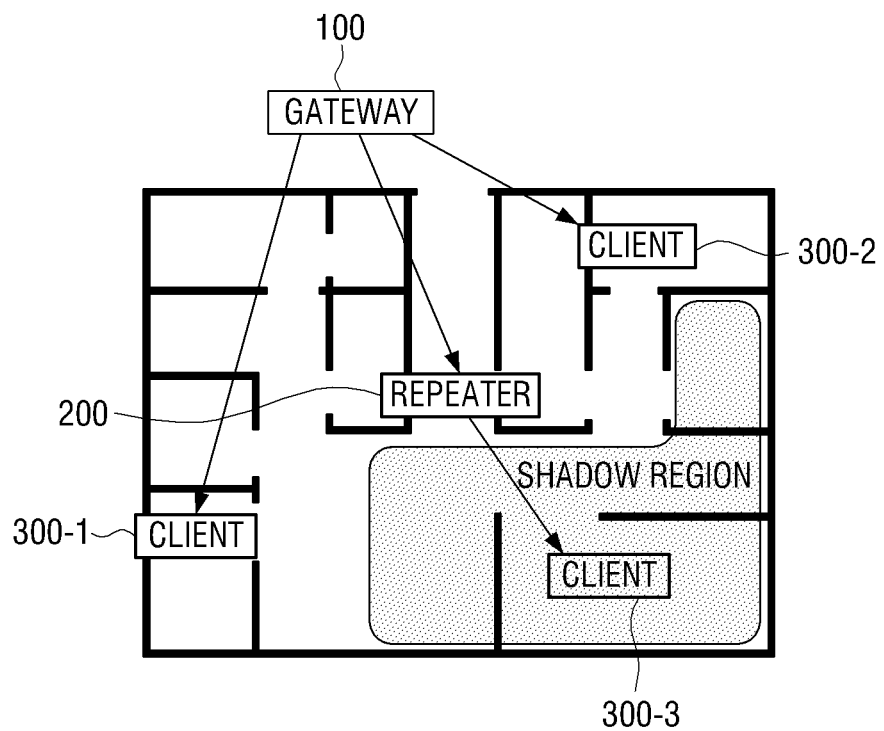
FIG. 15 is a view to schematically explain a method in which a broadcast signal is transmitted among a gateway apparatus, a repeater, and a client apparatus according to an exemplary embodiment.

FIG. 15 is a view to schematically explain a method for transmitting a broadcast signal among a gateway apparatus, a repeater, and a client apparatus according to an exemplary embodiment. As shown in FIG. 15, a client apparatus 300-3 located in a shadow region, that is, a region in which a transmission rate of a broadcast signal between a gateway apparatus 100 and the client apparatus 300-3 is lower than 20 Mbps or 30 Mbps, may receive the broadcast signal amplified by the repeater.

Figure 16:
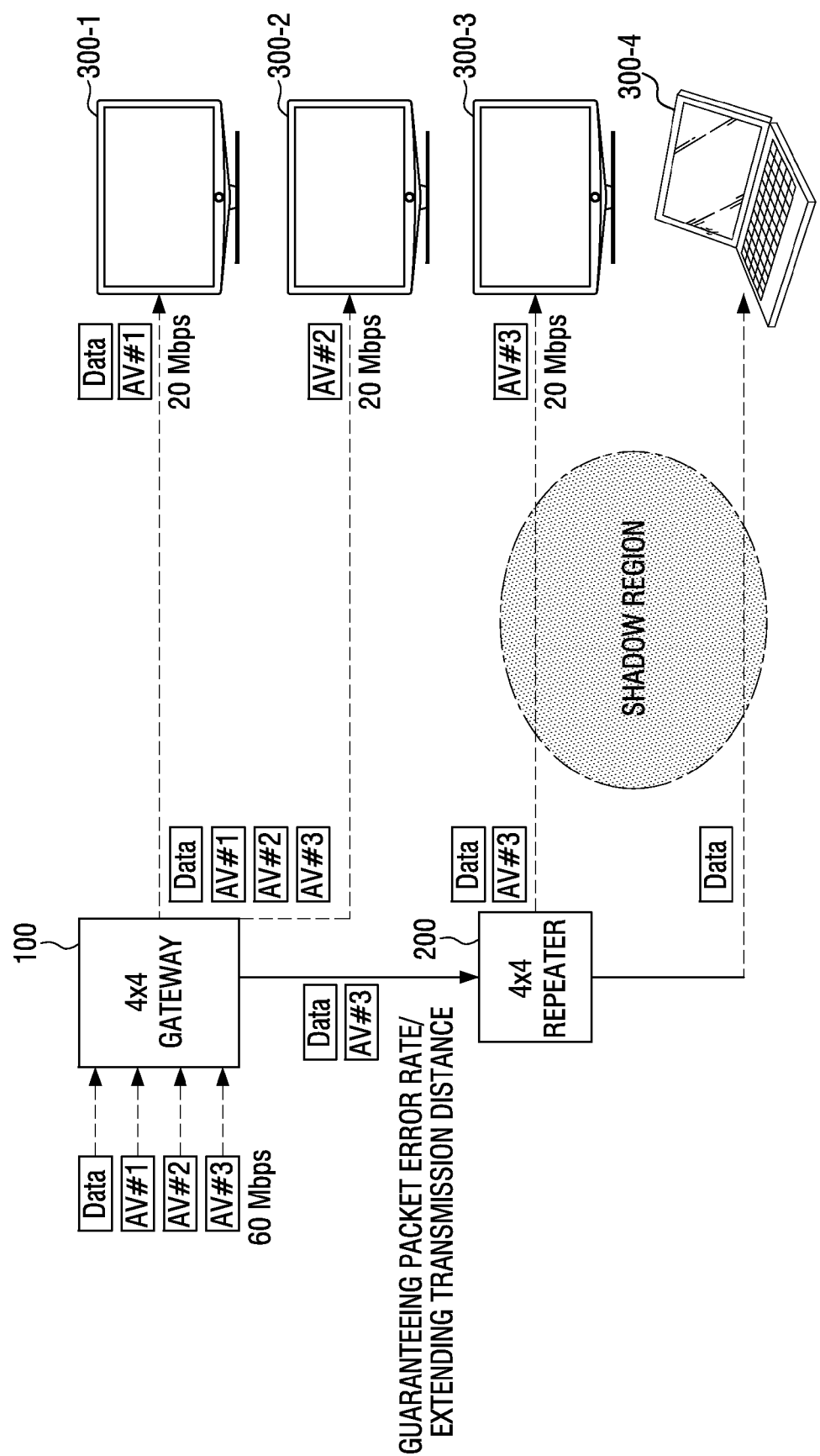
FIG. 16 is a view to schematically explain a method in which a broadcast signal is transmitted among a gateway apparatus, a repeater, and a client apparatus according to an exemplary embodiment.

FIG. 16 is a view to schematically explain a method for transmitting a broadcast signal among a gateway apparatus, a repeater, and a client apparatus according to an exemplary embodiment.

A gateway apparatus 100 transmits a broadcast signal and a data signal provided from external sources to a repeater 200 and a plurality of client apparatuses 300-1, 300-2, 300-3, and 300-4 provided in a home.

More specifically, the gateway apparatus 100 may convert a broadcast signal which is received from a corresponding channel according to a channel tuning command received from the plurality of client apparatuses 300-1, 300-2, 300-3 into an MPEG-2 TS format, and may transmit the broadcast signal using a 5 GHz band according to a Wi-Fi communication protocol. The gateway apparatus 100 may transmit the data signal using a 2.4 GHz according to the Wi-Fi communication protocol.

In this case, the gateway apparatus 100 may use 4×4 multiple-input multiple-output (MIMO) technology to transmit 4 separate streams in order to transmit the broadcast signal and the data signal.

In order to provide a seamless digital broadcast for the user, the broadcast signal exchanged between the client apparatus 300 and the gateway apparatus 100 should satisfy a predetermined transmission rate (for example, 20 Mbps to 30 Mbps).

In order to transmit the broadcast signal or the data signal, which is received from the gateway apparatus 100, to the client apparatuses 300-3 and 300-4 located in a region in which it is difficult to guarantee a constant transmission rate, the repeater should amplify the broadcast signal or the data signal.

In this case, the repeater 200 may differently operate a channel to receive the broadcast signal from the gateway apparatus 100 and a channel to transmit the broadcast signal to the client apparatus 300-3.

More specifically, the repeater 200 may receive the broadcast signal from the gateway apparatus 100 using an unlicensed frequency band that is upper than a DFS frequency band within the 5 GHz and may transmit the broadcast signal to the client apparatus 300 using an unlicensed frequency band that is lower than the DFS frequency band.

In this case, the repeater 200 may include a band pass filter, a high Q ceramic antenna and a shield to reduce interference which may occur due to the use of different channels in exchanging the broadcast signal.

Although the repeater 200 receives the broadcast signal from the gateway apparatus 100 using the unlicensed frequency band that is upper than the DFS frequency band and transmits the broadcast signal to the client apparatus 300 using the unlicensed frequency band that is lower than the DFS frequency band in the above exemplary embodiment, this is merely an example. That is, the repeater may receive the broadcast signal from the gateway apparatus 100 using the unlicensed frequency band that is lower than the DFS frequency band and may transmit the broadcast signal to the client apparatus 300 using the unlicensed frequency band that is upper than the DFS frequency band.

If two or more repeaters exist, the repeater 200 may use a channel that is separated from an exchanging channel used by another repeater using the DFS frequency band.

Figure 17:
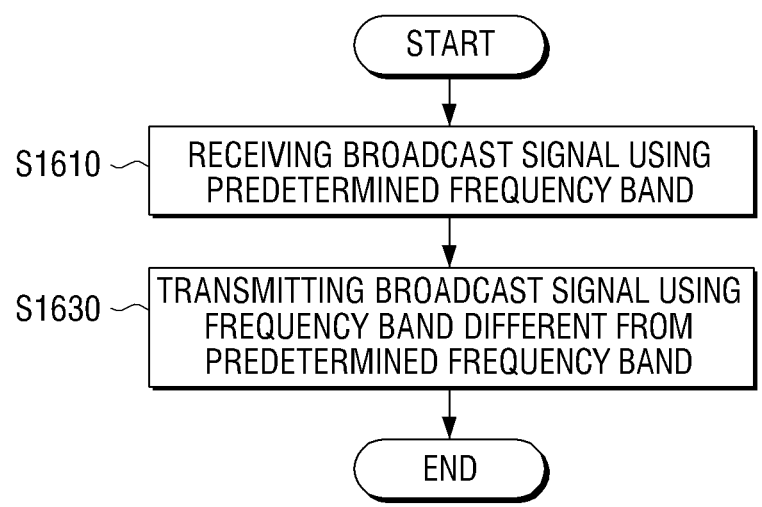
FIG. 17 is a flowchart illustrating a method for relaying a broadcast signal between a gateway apparatus and a client apparatus according to an exemplary embodiment.

FIG. 17 is a flowchart illustrating a method for relaying a broadcast signal between a gateway apparatus and a client apparatus according to an exemplary embodiment.

A broadcast signal is received from a gateway apparatus using a predetermined frequency band (S1610).

The broadcast signal is transmitted to a client apparatus using a frequency band different from the predetermined frequency band (S1620).

The predetermined frequency band and the different frequency band may be included in an unlicensed frequency band within the 5 GHz defined by the Wi-Fi communication protocol.

More specifically, the predetermined frequency band may be included in an unlicensed frequency band that is upper than a DFS frequency band defined within the 5 GHz, and the different frequency band may be included in an unlicensed frequency band that is lower than the DFS frequency band. Also, the predetermined frequency band may be included in an unlicensed frequency band that is lower than the DFS frequency band defined within the 5 GHz and the different frequency band may be included in an unlicensed frequency band that is upper than the DFS frequency band.

The present disclosure may include a storage medium including a program to execute the method for relaying the broadcast signal between the gateway apparatus and the client apparatus as described above, that is, a computer-readable recording medium. The computer-readable recording medium includes all types of recording apparatuses that can store data readable by a computer system. Examples of the computer-readable recording medium are a ROM, a RAM, a CD-ROM, a magnetic tape, a floppy disk, and an optical data storage apparatus, and the computer-readable recording medium may be distributed in a computer system connected through a network and thus may store a computer-readable code in a distributed manner and execute the code stored thereon.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A repeater comprising:
 a first interface which is configured to be connected to a gateway apparatus via a wireless communication protocol and is configured to receive a broadcast signal from the gateway apparatus; and
 a second interface which is configured to be connected to a client apparatus via the wireless communication protocol and is configured to transmit the broadcast signal to the client apparatus,
 wherein the first interface and the second interface use different frequency bands comprising a first frequency band that is an unlicensed frequency band higher than a dynamic frequency selection (DFS) frequency band, and a second frequency band that is an unlicensed frequency band lower than the DFS frequency band,
 wherein the first frequency band, the second frequency band, and the DFS frequency band are within a 5 GHz frequency band defined by the wireless communication protocol,
 wherein, when the first interface receives the broadcast signal from the gateway apparatus through the first frequency band, the second interface transmits the broadcast signal to the client apparatus through the second frequency band, and
 wherein, when the first interface receives the broadcast signal from the gateway apparatus through the second frequency band, the second interface transmits the broadcast signal to the client apparatus through the first frequency band.

2. The repeater as claimed in claim 1, wherein the first interface further comprises a first antenna,
 wherein the second interface further comprises a second antenna, and
 wherein resonant frequencies of the first and second antennas are respectively tuned to the different frequency bands.

3. The repeater as claimed in claim 2, wherein at least one of the first and second antennas is ceramic and has a Q value larger than a predetermined Q value.

4. A broadcast transmitting system comprising:
 a gateway apparatus; and
 a repeater,
 wherein
 the gateway apparatus and the repeater are connected to each other according to a wireless communication protocol,
 wherein the gateway apparatus transmits a broadcast signal to the repeater via a predetermined frequency band, and
 the repeater transmits the broadcast signal to a client apparatus via a different frequency band, which is different from the predetermined frequency band,
 wherein, when the repeater receives the broadcast signal from the gateway apparatus through a first frequency band that is an unlicensed frequency band higher than a dynamic frequency selection (DFS) frequency band, the repeater transmits the broadcast signal to a client apparatus through a second frequency band that is an unlicensed frequency band lower than the DFS frequency band,
 wherein the first frequency band, the second frequency band, and the DFS frequency band are within a 5 GHz frequency band defined by the wireless communication protocol, and
 wherein, when the repeater receives the broadcast signal from the gateway apparatus through the second frequency band, the repeater transmits the broadcast signal to the client apparatus through the first frequency band.

5. The broadcast transmitting system as claimed in claim 4, wherein the repeater transmits a channel tuning command requested by the client apparatus to the gateway apparatus, and wherein the gateway apparatus transmits a broadcast signal corresponding to the channel tuning command to the repeater.

6. The broadcast transmitting system as claimed in claim 5, wherein the gateway apparatus comprises:

an interface which is connected to the repeater according to the wireless communication protocol;

a tuner unit which tunes to a channel according to the channel tuning command received from the repeater;

a signal processor which processes the broadcast signal, the broadcast signal being received through the channel tuned by the tuner unit; and a controller which controls the interface to transmit the broadcast signal, which is processed by the signal processor, to the repeater via the different frequency band.

7. The broadcast transmitting system as claimed in claim 6, wherein the signal processor converts the broadcast signal into an MPEG-2 transport stream (TS), wherein the interface transmits the MPEG-2 TS to the repeater via an unlicensed frequency band within a frequency band of 5 GHz defined by the wireless communication protocol.

8. A method for relaying a broadcast signal between a gateway apparatus and a client apparatus, the method comprising:

receiving the broadcast signal from the gateway apparatus via a predetermined frequency band;

transmitting the broadcast signal to the client apparatus via a different frequency band, which is different from the predetermined frequency band; and wherein, when the broadcast signal is received from the gateway apparatus through a first frequency band that is an unlicensed frequency band higher than a dynamic frequency selection (DFS) frequency band, the transmitting comprises transmitting the broadcast signal to the client apparatus through a second frequency band that is an unlicensed frequency band lower than the DFS frequency band, wherein, when the broadcast signal is received from the gateway apparatus through the second frequency band, the transmitting comprises transmitting the broadcast signal to the client apparatus through the first frequency band, and wherein the first frequency band, the second frequency band, and the DFS frequency band are within a 5 GHz frequency band defined by the wireless communication protocol.

\* \* \* \* \*